J. M. CHAPPEL.
PLIERS.
APPLICATION FILED APR. 28, 1906.
975,385.
Patented Nov. 8, 1910.
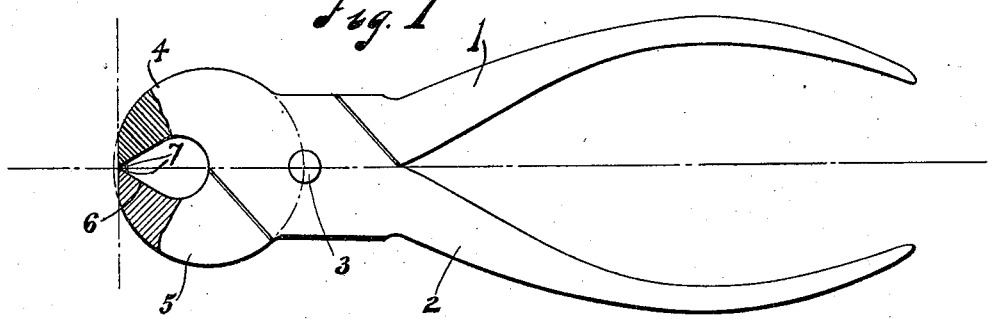
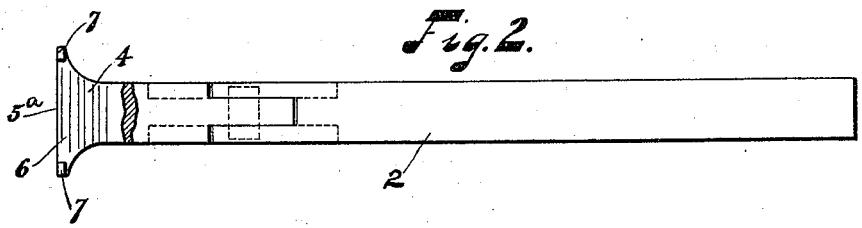
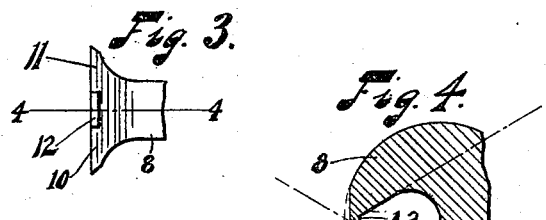
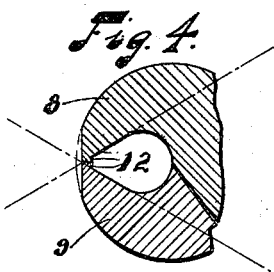
Witnesses:
Edw. Lindmueller.
Della Gutentag
Inventor:
James M. Chappel,
By Bluford W. Brockett,
His Attorney.
THE NORRIS PETERS CO., WASHINGTON, D. C.

UNITED STATES PATENT OFFICE.

JAMES M. CHAPPEL, OF DALLAS, TEXAS.

PLIERS.

975,385.

Specification of Letters Patent. Patented Nov. 8, 1910.

Application filed April 28, 1906. Serial No. 314,304.

*To all whom it may concern:*

Be it known that I, JAMES M. CHAPPEL, residing at Dallas, in the county of Dallas and State of Texas, have invented a certain new and useful Improvement in Pliers, of which the following is a full, clear, and exact description, reference being had to the accompanying drawings.

Opticians, in assembling spectacles and eyeglasses, are required to cut off the projecting ends of the screws and rivets and for doing this numerous cutting devices, such as pliers, have been devised but there are numerous difficulties attending to their use on account of the fact that in parting the portions of the screw the workman is required to use sufficient strength to force the jaws into the material and in doing so is apt to snap the portions of the screw apart with the result of oftentimes breaking a lens, aside from leaving a rough unfinished end which has to be filed off or otherwise smoothed down. In fact the trade has gone to the length of providing a pair of pliers with a stop screw on the handles for the purpose of preventing the jaws from coming so close together that the cutting edges jam against each other, but the stop screw is very hard to keep tight and does not actually keep the cutting edges apart on account of the springing of the parts between such edges and the handles. This renders it necessary to provide the jaws with cutting edges which are not flush with the forward ends of the jaws, but have receding beveled faces at the front ends with the result that when the projecting end of a screw is being cut from the part holding the lens, for example, such part is forced away from the pliers with a quick snap which very often breaks a lens, aside from leaving a projecting portion of the screw or rivet extending from the part. It also happens in the optical trade that there are small screws which must be cut off, or the shanks shortened, before they are inserted into the parts to which they are applied. When these screws are placed between the jaws of the ordinary pliers the amount of force required to cut the screw severs the parts with such a quick snap that the head flies in one direction while the part which is not used drops into the hand of the workman or else remains between the jaws of the pliers. All of these difficulties have been found to be due largely to the construction of the cutting edges of the pliers and it is to obviate these difficulties that the present invention has been devised.

This invention contemplates the use of any preferred form of pliers provided with meeting cutting edges which are flush with the ends of the jaws and are provided with means which prevent them from jamming against each other and thus causing their injury.

The invention may be further briefly summarized as consisting in the construction and combination of parts hereinafter described reference being had to the following description, drawings, and claim.

Referring to the drawings, Figure 1 is a side elevation of a pair of pliers constructed according to my invention with a portion of each of the jaws broken away to more clearly show the construction thereof; Fig. 2 is an edge view of the pliers with one of the jaws broken away; Fig. 3 is a view of a modification; Fig. 4 is a section on the line 4—4 of Fig. 3, and Fig. 5 shows a side elevation of a screw which has been cut by my device.

In carrying out my invention any preferred form and construction of pliers may be employed but I have shown an embodiment in the drawings which meets the required demand very effectively, and in such embodiment 1, and 2, represent the handles which are pivoted together by means of a rivet 3, and are provided upon their forward ends with jaws 4 and 5. I prefer to make these jaws in the form of a circle the circumference of which passes through the central axis of the pivot 3, whereby when they move toward each other they will tend to come together toward the object upon which they are operating and there will be no part which will project beyond the cutting edge to be described. Each one of the jaws 4 and 5 is provided with a cutting edge $5^a$, which is formed by cutting away the metal at the ends of the jaws in the chord of the circle of the jaws, and at a right angle to the longitudinal axis of the pliers or a line passing through the cutting edges when they are together and through the central axis of the pivotal point. The inner faces 6, of each of the jaws are inclined at an angle to the front faces of the jaws such, that they will tend, when brought together, to draw the metal back from the part of the screw which is to be left without creating too great a resistance to the closing of the jaws, and at the same time leaving sufficient metal in the jaws to render them strong enough to stand the work. I have found in practice that an angle of 60 degrees renders these jaws capable of operating with great efficiency.

I have provided suitable means upon the faces of the jaws for preventing the cutting edges from jamming against each other, and this means consists preferably of a pair of flat faced projections 7, on the face 6, of each jaw and near the ends thereof whereby when they come together the projection 7, of one jaw will engage the projection on the other jaw and hold the cutting edges sufficiently to prevent the jamming referred to.

It has been found in practice that pliers constructed according to the teachings of my invention operate with such great efficiency, that a screw may be placed between the jaws and when the pliers are turned in a substantially vertical position with the jaws uppermost, the screw will be cut completely and the part thereof remaining above the jaws of the pliers will stay in that position during the cutting operation, and even afterward without being held in any way other than by the action of the jaws themselves, and yet the portion of the screw just mentioned is so sensitively held by the jaws, after it is cut, that it may be blown off by the breath. Upon examining the cut face of the end of the screw it has been found to have a very fine polish and there is merely a line across the same where the edges of the two jaws come together.

This device is of great utility in cutting off screws which project through parts in eyeglasses since the cutting edges come together close to the face of the part and leave the end of the screw flush with such face.

In a modification shown in Figs. 3 and 4, the jaws 8 and 9, are provided with the cutting edges 10, and 11, near the ends thereof. These edges are separated by flat projections 12, located centrally with respect to each jaw whereby the extreme ends of the cutting edges of the jaws may be used where it is impossible to get at the part with pliers constructed in the other way.

Having described my invention I claim:

In a pair of pliers, in combination, a pair of jaws having transverse sharp cutting edges which meet and are flush with the end faces of the jaws from which they taper inwardly, said faces being in the same plane with and at substantially right angles to the longitudinal axis of the pliers, and projections at the ends of said jaws and between the same for preventing the cutting edges from jamming against each other.

In testimony whereof I affix my signature in the presence of two witnesses.

JAMES M. CHAPPEL.

Witnesses:
 DELLA GUTENTAG,
 B. W. BROCKETT.